(12) United States Patent
Schwartz et al.

(10) Patent No.: US 12,466,356 B2
(45) Date of Patent: Nov. 11, 2025

(54) VEHICLE-SENSITIVE SENSOR FOR A SELF-LOCKING BELT RETRACTOR

(71) Applicant: Autoliv Development AB, Vargarda (SE)

(72) Inventors: Marcus Schwartz, Pinneberg (DE); Markus Hueg, Hamburg (DE)

(73) Assignee: Autoliv Development AB, Vargarda (SE)

( * ) Notice: Subject to any disclaimer, the term of this patent is extended or adjusted under 35 U.S.C. 154(b) by 211 days.

(21) Appl. No.: 18/260,564

(22) PCT Filed: Jan. 10, 2022

(86) PCT No.: PCT/EP2022/050338
§ 371 (c)(1),
(2) Date: Jul. 6, 2023

(87) PCT Pub. No.: WO2022/148863
PCT Pub. Date: Jul. 14, 2022

(65) Prior Publication Data
US 2024/0051493 A1    Feb. 15, 2024

(30) Foreign Application Priority Data

Jan. 11, 2021 (DE) ..................... 10 2021 100 322.9

(51) Int. Cl.
*B60R 22/40* (2006.01)
*B60R 22/36* (2006.01)

(52) U.S. Cl.
CPC .............. *B60R 22/40* (2013.01); *B60R 22/36* (2013.01)

(58) Field of Classification Search
CPC .............................. B60R 22/40; B60R 22/36
USPC ........................................... 242/383.2, 384.6
See application file for complete search history.

(56) References Cited

U.S. PATENT DOCUMENTS

| | | | | |
|---|---|---|---|---|
| 4,998,684 A * | 3/1991 | Mori | ....................... | B60R 22/40 242/384.6 |
| 6,230,997 B1 * | 5/2001 | Palliser | ................... | B60R 22/40 280/806 |
| 10,793,104 B2 * | 10/2020 | Jabusch | .................. | B60R 22/40 |
| 2012/0256032 A1 * | 10/2012 | Evers | ...................... | B60R 22/40 242/384 |
| 2018/0272989 A1 | 9/2018 | Jabusch | | |
| 2020/0148163 A1 * | 5/2020 | Brosowski | ............. | B60R 22/41 |

FOREIGN PATENT DOCUMENTS

| | | |
|---|---|---|
| DE | 19539619 A1 | 4/1997 |
| DE | 10230211 B4 | 7/2004 |
| DE | 102015017201 A1 | 6/2017 |

(Continued)

*Primary Examiner* — Anna M Momper
*Assistant Examiner* — Ermia E. Melika
(74) *Attorney, Agent, or Firm* — Dickinson Wright PLLC

(57) ABSTRACT

The present invention relates to a vehicle-sensitive sensor for a self-locking belt retractor, comprising:
  a support part,
  a sensor mass which is disposed vertically on a contact surface of the support part and can tilt relative to the support part and
  a locking lever which is coupled to the sensor mass and has an engagement tip, wherein the locking lever has at least two rotation elements for forming an axis of rotation for the locking lever, and wherein
each rotation element rests on an associated contact point of the support part.

8 Claims, 5 Drawing Sheets

(56) References Cited

FOREIGN PATENT DOCUMENTS

Figure 1:
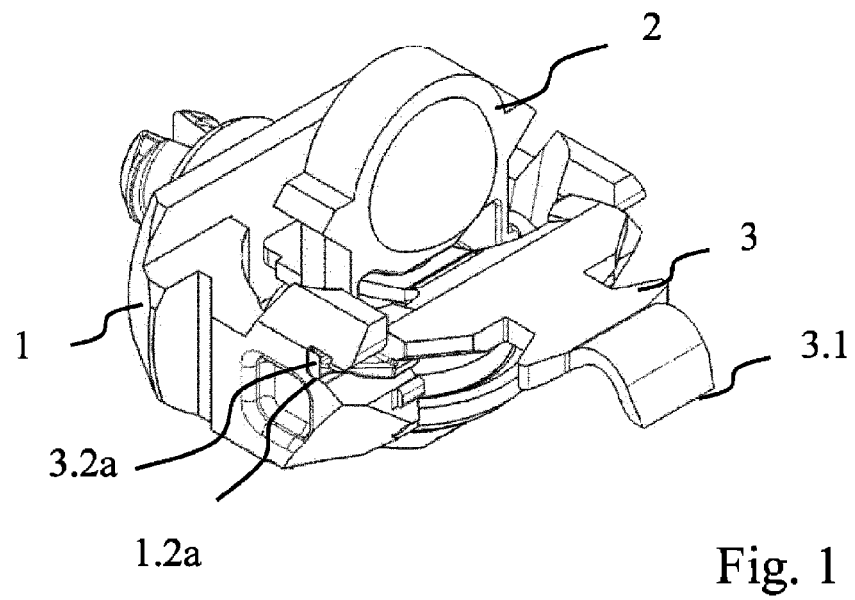

| EP | 1519860 A1 | 4/2005 | |
| EP | 3459797 B1 | 11/2019 | |
| WO | WO-2011057732 A1 * | 5/2011 | ............. B60R 22/40 |

* cited by examiner

VEHICLE-SENSITIVE SENSOR FOR A SELF-LOCKING BELT RETRACTOR

The present invention relates to a vehicle-sensitive sensor for a self-locking belt retractor, comprising a support part, a sensor mass which is disposed vertically on a contact surface of the support part and can tilt relative to the support part, and a locking lever which is coupled to the sensor mass and has an engagement tip, wherein the locking lever has at least two rotation elements for forming an axis of rotation for the locking lever, and wherein each rotation element rests on an associated contact point of the support part. The invention also relates to a self-locking belt retractor with a vehicle-sensitive sensor.

A sensor with the aforementioned features is known, for example, from EP 3 459 797 B1. Such a sensor is used in a locking system for a belt winding shaft, where, when triggered, the vehicle-sensitive sensor mass moves the locking lever with its engagement tip so as to engage with the toothing of a control disk, so that the control disk is stopped in its rotational movement shared with the belt winding shaft, thereby activating the blocking system.

It has now been found that, despite known countermeasures, the locking lever releases from its holder in impact situations, enabling a rotational movement. In particular at high temperatures, it was observed that the locking lever is released from its anticipated positions and/or is inhibited in its rotational movement so that the activation of the blocking system is not ensured.

The object of the present invention is to at least partially solve the disadvantages described with reference to the prior art and, in particular, to specify a vehicle-sensitive sensor whose robustness against malfunctions is increased.

A possible solution to this one object is indicated by a vehicle-sensitive sensor having the features of independent claim 1. Possible further solutions and advantageous further developments of the sensor are indicated in the dependent claims and in the description, wherein individual features from the dependent claims and the description can be combined with one another in a technically meaningful manner.

The vehicle-sensitive sensor comprises in particular a support part, a sensor mass and a locking lever.

In the normal state, when installed as intended, the sensor mass is in particular disposed vertically on a contact surface of the support part and can tilt relative to the support part.

The locking lever is coupled to the sensor mass, in particular by the locking lever passing through the one-part, two-part or multi-part sensor mass, wherein a contact point between the section of the locking lever passing through the sensor mass and the sensor mass is preferably realized by means of at least one elevation.

The locking lever also has an engagement tip, which is in particular opposite the section through which the sensor mass passes. The locking lever and, if applicable, the sensor mass can be designed in particular in the contacting region in such a way that the locking lever executes a rotational movement upon a tilting movement of the sensor mass. In addition to the rotational movement, however, the axis of rotation defined by the rotational movement can also be displaced linearly.

To form an axis of rotation, the locking lever can have at least two, preferably exactly two rotation elements. The rotation elements are in particular formed at two lateral ends of the locking lever.

In the normal state when installed as intended, the rotation elements are each located on a contact point formed by the support part. Preferably, the rotation elements have a rounded outer circumferential design on their underside, over which the locking lever rolls from the contact point during the rotational movement triggered by the tilting sensor mass.

In one embodiment, it is proposed that the support part has a recess for each rotation element, and that a base of the recess forms the contact point for a rotation element. It is further proposed that the base is at least partially, preferably completely, covered by a cover of the respective recess, and therefore in the assembled normal state, at least also the rotation element is covered by a cover of the respective recess at least partially, preferably completely. This ensures that, even in impact situations, the rotation element does not lift off the base by an undefined distance. Instead, it is ensured that the rotation element abuts the cover of the recess during a lifting movement off the base and therefore remains at its intended location.

Preferably, exactly two recesses are formed in lateral regions of the support part for the exactly two rotation elements of the locking lever. Each recess accommodating a rotation element therefore has a base and a cover that covers this base at least in the region of the rotation element.

The recess can also have an opening through which the respective rotation element can be inserted/pushed into the recess. Such an opening is in particular disposed on a front side of the support part, that is to say, on a side facing away from the contact surface and the sensor mass. Therefore during assembly, the locking lever can, on the one hand, be inserted with its corresponding section into the sensor mass and, in so doing, be inserted with the rotation elements through the openings into the recesses.

In order to prevent the locking lever from falling out of the recess through the opening during a corresponding orientation of the sensor, the cover of the recess can have a downwardly projecting projection. The projection can in particular be designed in such a way that the rotation element, which is in particular non-circular in cross-section, cannot be inserted through the opening into the recess in any desired orientation.

Alternatively, it can be provided that the projection and the rotation element are matched to one another in such a way that the locking lever with the rotation element can only be inserted through the opening into the recess with a certain pressure, so that the rotation element cannot simply fall out of the recess. During insertion, the projection/support part could, for example, deform elastically.

However, the projection can also additionally or alternatively have a further function. The projection can therefore be designed and disposed such that a (rotational) movement of the rotation element is limited by the rotation element coming into contact with the projection during its movement triggered by the sensor mass. Accordingly, however, a maximum deflection angle of the engagement tip of the locking lever is also predefined by the projection.

In order to simplify the insertion of the locking lever into the support part, it can be provided that the opening tapers towards the bottom of the recess. Accordingly, while the bottom of the recess is oriented horizontally in an intended normal state, the opening drops toward the front from the end of the base.

In combination with a projection on the cover of the recess, it can be provided that a transition from the tapering opening to the bottom of the recess is disposed behind the projection in an introduction direction of the rotation element. In particular when the rotation element has a non-circular outer circumferential design, this makes it possible for the rotation element to be inserted into the recess through the opening in an assembly orientation and to be brought into the intended normal state by rotating in the recess, wherein the projection prevents the rotation element from coming out of the recess by a linear movement, wherein the projection is simultaneously able to limit a rotational movement of the locking lever. Coupling with the sensor mass can also prevent the locking lever from returning to the assembly orientation position, and can therefore prevent the rotation element from unintentionally coming out of the recess.

In order to additionally or alternatively limit the rotational movement of the locking lever, provision can be made for a forwardly projecting stop element to be assigned to each recess. The stop element is in each case formed on the front side of the carrier element (and therefore extends in the direction of the engagement tip of the locking lever). In particular, this stop element is disposed offset inward relative to the recess. The stop element can also be disposed directly below the tapering opening.

In this context, it can be provided that the locking lever preferably has protrusions that project downwards in a region between the rotation elements and the engagement tip and are each assigned to a stop element. During a rotational movement of the locking lever triggered by the tilting movement of the sensor mass, the protrusion on the locking lever therefore comes into contact with the stop element on the support part. The protrusions are, in particular, disposed on the inside and facing the engagement tip, starting from the rotation elements disposed on the outside of the locking lever.

To form a non-circular outer circumferential design, the outer circumferential design of the rotation elements can be oval. Accordingly, the rotation elements have convexly shaped curvatures in the normal orientation as intended both on the upper side and on the underside, while the lateral edges therebetween run in a straight line and vertically.

For rolling during the rotational movement of the locking lever, the rotation element can have a symmetrical (in particular partially circular) curvature design on its underside. In a preferred embodiment, however, it can also be provided that the rotation element has an asymmetrical curvature on its underside. In this case, the curvature starting from the contact point in the normal position in the direction of the front and therefore in the direction of the rolling movement of the locking lever from the normal position is different from that in the direction of the rear. Such a different curvature can also be configured to insert the locking lever with the rotation elements in the assembly orientation through the opening into the recess and to pivot it there into the normal position, whereby the locking lever is secured against unintentional falling out.

Figure 2:
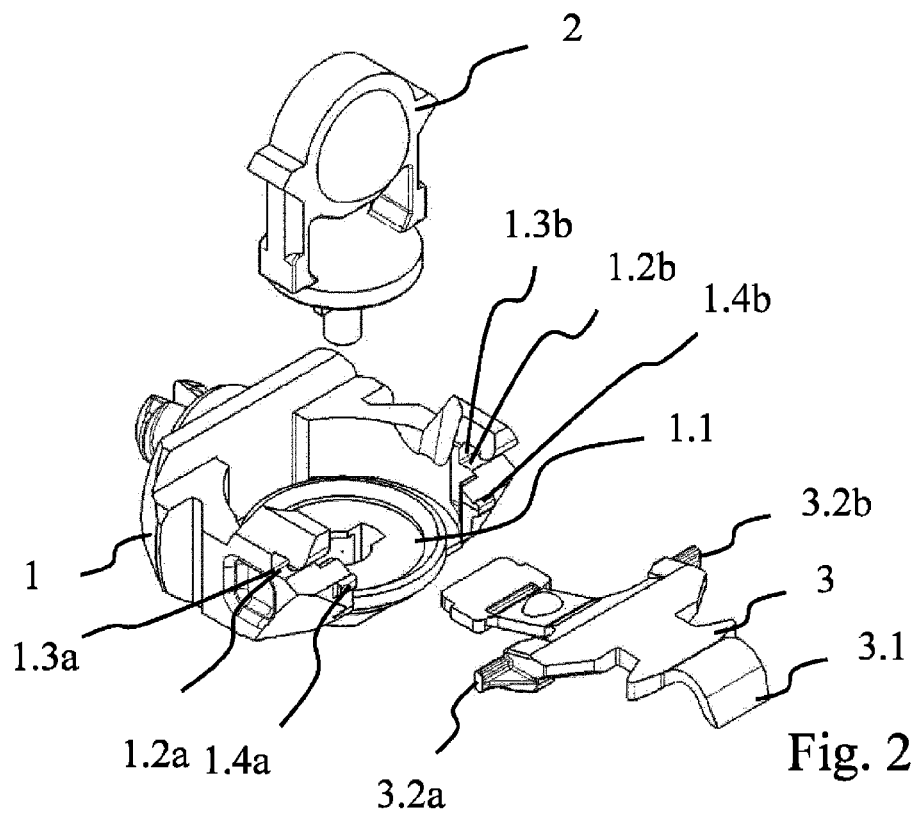
Figure 3:
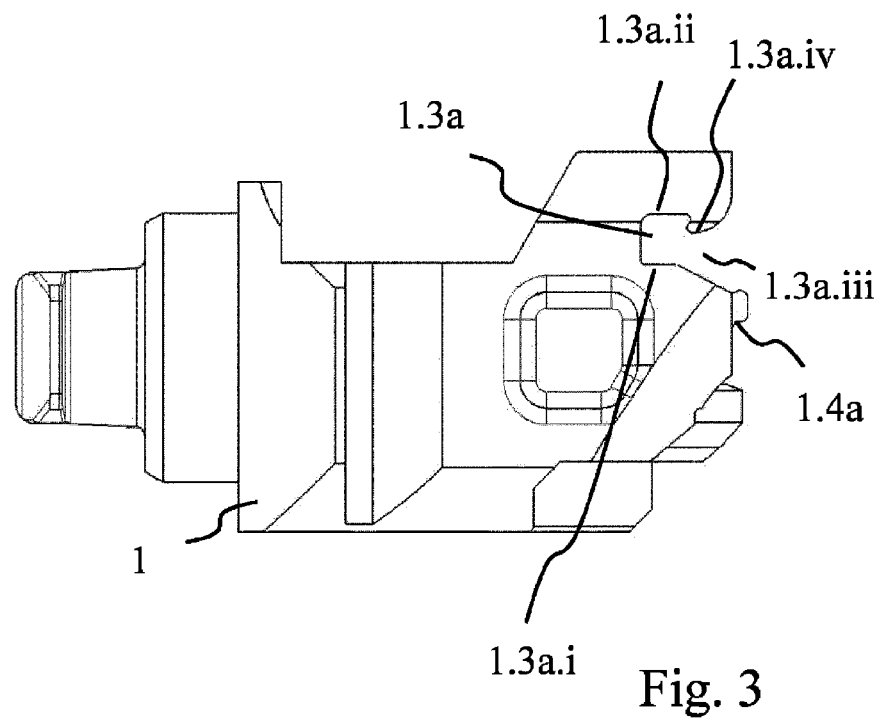
Figure 4:
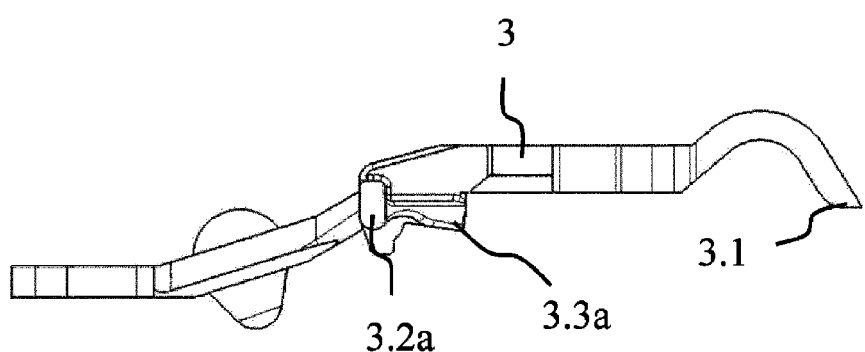
Figure 5:
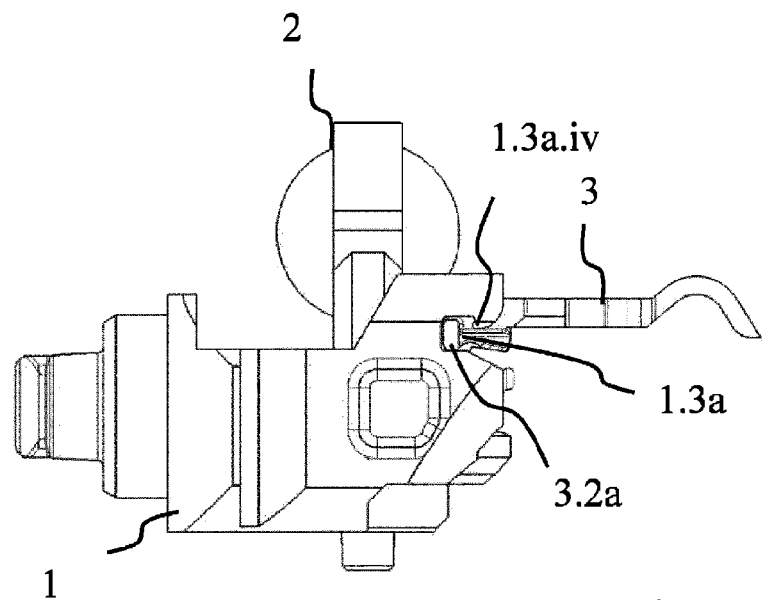
Figure 6:
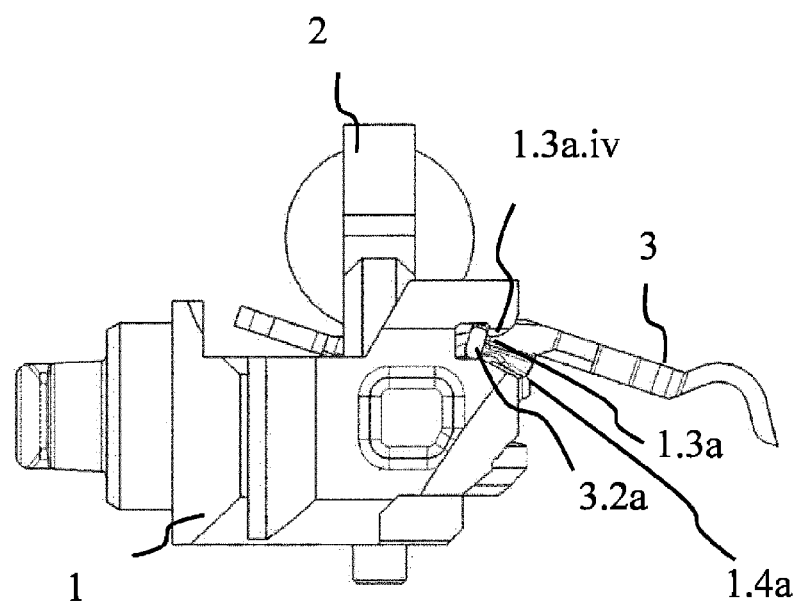
Figure 7:
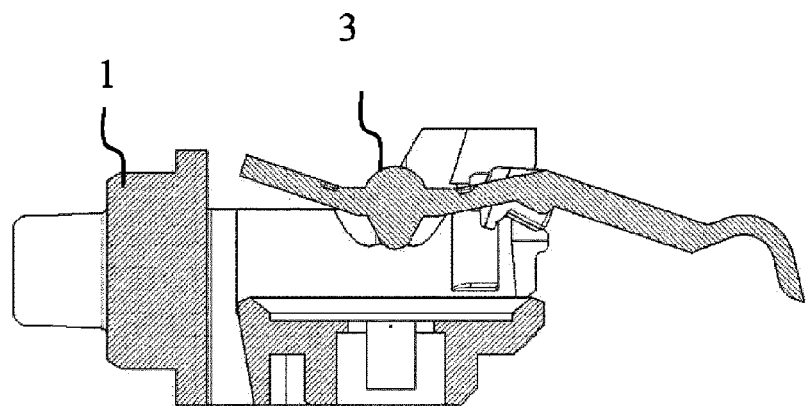
Figure 8:
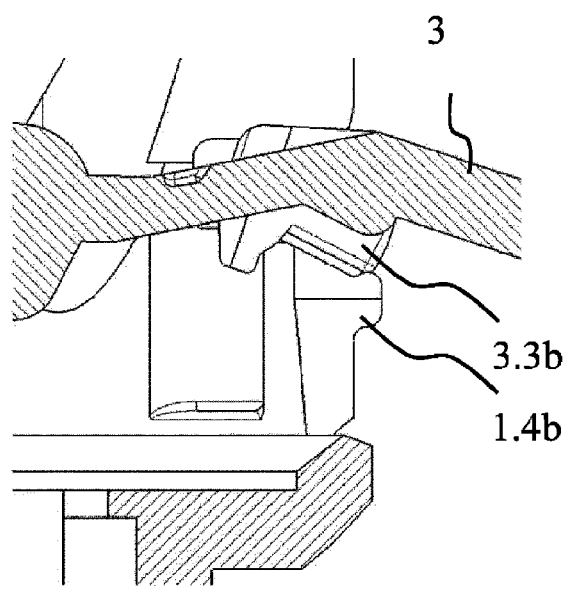
Figure 9:
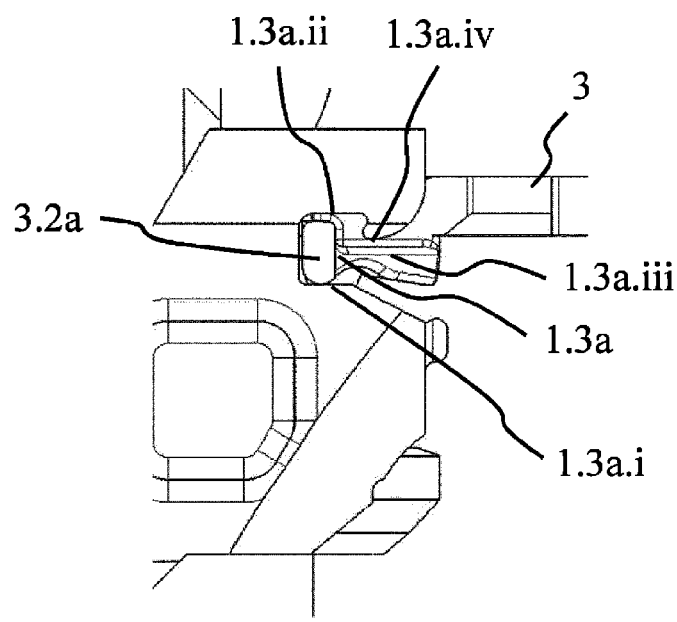
Figure 10:
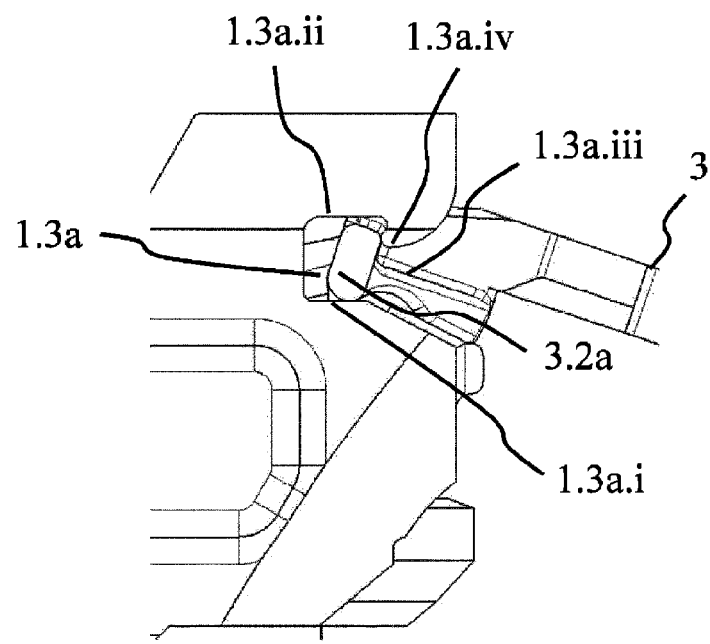

The invention and the technical environment are explained below by way of example with reference to the figures. The following are shown schematically:

FIG. 1: a perspective view of a vehicle-sensitive sensor,
FIG. 2: an exploded view of the sensor,
FIG. 3: a side view of a support part of the sensor,
FIG. 4: a side view of a locking lever of the sensor,
FIG. 5 a side view of the sensor in a normal position,
FIG. 6: the side view with a rotated locking lever,
FIG. 7: a sectional view through the support part and the locking lever in the rotated state,
FIG. 8: a detail view of FIG. 7,
FIG. 9: a detail view of the side view of the sensor in the normal position, and
FIG. 10: the detail view according to FIG. 9 with a rotated locking lever.

The vehicle-sensitive sensor shown in the figures comprises a support part 1, a sensor mass 2 and a locking lever 3.

The support part 1 comprises a contact surface 1.1 (see FIG. 2) on which the sensor mass 2 stands and to which the sensor mass 2 is arranged to tilt.

The locking lever 3 comprises an engagement tip 3.1 and a section on the side opposite the engagement tip 3.1, which section extends through the sensor mass 2 (see FIG. 1) in the assembled state. At its lateral edges, the locking lever 3 comprises rotation elements 3.2*a* and 3.2*b*. In addition, the locking lever comprises protrusions 3.3*a* and 3.3*b* on its underside adjacent to the rotation elements 3.2*a* and 3.2*b*.

The support part 1 has recesses 1.3*a* and 1.3*b* in its lateral regions, each of which forms a contact point 1.2*a* and 1.2*b* for the rotation elements 3.2*a* and 3.2*b* of the locking lever 3 with their base. As can be seen in particular from FIG. 3, the recess 1.3*a* has, in addition to the base 1.3*a.i*, a cover 1.3*a.ii* which covers the base 1.3*a.i*. The recess 1.3*a* also has an opening 1.3*a.iii* in its front side. The opening 1.3*a.iii* is designed such that it tapers from the front side to the recess 1.3*a*. In addition, the recess 1.3*a* has a downwardly projecting projection 1.3*a.iv* on its cover 1.3*a.ii*.

Two stop elements 1.4 *a* and 1.4*b* are also disposed on the front side of the support part 1 and are disposed on the front side offset inward with respect to the recesses 1.3*a* and 1.3*b*.

The opening 1.3*a.iii* and the projection 1.3*a.iv* are designed such that the associated rotation element 3.2*a* of the locking lever 3 can only be inserted into the recess 1.3 in a certain orientation. The locking lever 3 is then oriented such that it is located in the normal position shown in FIG. 5. It can also be seen from FIG. 5 that the locking lever 3 cannot pass out of the recess 1.3*a* by a simple linear movement to the front side (i.e., to the right in FIG. 5), since it would abut against the projection 1.3*a.iv*.

The normal position is also shown in detail in FIG. 9. It can be seen here that the base 1.3*a.i* of the recess 1.3*a* is covered by the cover 1.3*a.ii* and that the projection 1.3*a.iv* projects downwards enough for it overlap with the rotation element 3.2*a* that is not circular in its outer circumferential design.

FIGS. 6 and 10 show the locking lever 3 in a rotated position. It can be seen that the rotation element 3.2*a* comes into contact with the projection 1.3*a.iv* by an upper section, whereby the rotational movement of the locking lever 3 is limited. It can also be seen in FIGS. 9 and 10 that the curvature of the rotation element 3.2*a* in its lower section, by which the rotation element 3.2*a* rests on the base 1.3*a.i*, is asymmetrical with respect to the contact point.

It is also apparent from the cross-sectional views shown in FIGS. 7 and 8 that, in the rotated position of the locking lever 3, the locking lever 3 rests by the protrusion 3.3*b* against the stop element 1.4*b* formed on the support part 1, as a result of which the rotational movement of the locking lever 3 is likewise limited.

LIST OF REFERENCE SIGNS

1 Support part
1.1 Contact surface
1.2*a* Support point
1.2*b* Support point
1.3*a* Recess
1.3*b* Recess
1.3*a.i* Base
1.3*a.ii* Cover
1.3*a.iii* Opening 1.3a.iv Projection
1.4a Stop element
1.4b Stop element
2 Sensor mass
3 Locking lever
3.1 Engagement tip
3.2a Rotational element
3.2b Rotational element
3.3a Protrusion
3.3b Protrusion

The invention claimed is:

1. A vehicle-sensitive sensor for a self-locking belt retractor, comprising:
   a support part,
   a sensor mass which is disposed vertically on a contact surface of the support part and can tilt relative to the support part and
   a locking lever which is coupled to the sensor mass and has an engagement tip, wherein the locking lever has at least two rotation elements for forming an axis of rotation for the locking lever, and
   wherein each rotation element rests on an associated contact point of the support part,
   wherein the support part has a recess for each rotation element with each recess having a front opening by means of which the rotation element can be introduced into the recess, and
   wherein a base of the recess forms a contact point, wherein the base is covered by a cover of the respective recess and each opening narrows towards the base of the recess.

2. The sensor according to claim 1, wherein the cover of the recess has a downwardly projecting projection which limits a rotational movement of the rotation element.

3. The sensor according to claim 1, wherein the narrowing of the opening towards the base of the recess comprises a tapering of the opening to the bottom of the base, such that a transition from the tapering opening to the bottom of the recess is disposed behind the projection in an introduction direction of the rotation element.

4. The sensor according to claim 1, wherein a forwardly projecting stop element is assigned to each recess which limits a rotational movement of the locking lever.

5. The sensor according to claim 4, wherein the locking lever has protrusions which are assigned to the stop elements in connection sections between the rotation elements and the engagement tip.

6. The sensor according to claim 1, wherein each rotation element has an asymmetric curvature on its underside starting from a minimum defined by a normal position.

7. The sensor according to claim 1, wherein the rotation elements have an oval outer circumferential shape.

8. A belt retractor having the sensor according to claim 1.

* * * * *